(12) United States Patent
Kudo et al.

(10) Patent No.: US 6,676,527 B2
(45) Date of Patent: Jan. 13, 2004

(54) ATTACHMENT STRUCTURE FOR JOINT BOOT

(75) Inventors: Satoru Kudo, Utsunomiya (JP); Yasuhisa Nagayama, Mooka (JP); Masafumi Yamamoto, Mooka (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/033,784

(22) Filed: Jan. 3, 2002

(65) Prior Publication Data
US 2002/0094875 A1 Jul. 18, 2002

(30) Foreign Application Priority Data
Jan. 16, 2001 (JP) .......... 2001-007908

(51) Int. Cl.⁷ .......... F16J 15/52
(52) U.S. Cl. .......... 464/175; 277/636
(58) Field of Search .......... 464/173, 175; 277/634–636; 403/50, 51; 285/226, 256

(56) References Cited

U.S. PATENT DOCUMENTS

| | | | | |
|---|---|---|---|---|
| 3,498,622 A | * | 3/1970 | Belart | .......... 277/634 |
| 3,858,412 A | | 1/1975 | Fisher et al. | |
| 4,729,583 A | * | 3/1988 | Lalikos et al. | .......... 285/256 X |
| 4,747,805 A | * | 5/1988 | Welschof et al. | .......... 464/175 |
| 4,938,726 A | | 7/1990 | Bland et al. | |
| 4,969,668 A | * | 11/1990 | Sauer | .......... 285/256 |
| 5,183,351 A | * | 2/1993 | Schneider | .......... 277/636 |
| 5,230,660 A | * | 7/1993 | Warnke | .......... 464/173 X |
| 5,725,433 A | | 3/1998 | Kudo et al. | |
| 5,794,986 A | * | 8/1998 | Gansel et al. | .......... 285/226 |

FOREIGN PATENT DOCUMENTS

| | | | | |
|---|---|---|---|---|
| DE | 2 314 770 | * | 11/1973 | .......... 464/173 |
| DE | 29 27 648 A1 | | 1/1981 | |
| DE | 36 44 888 A1 | | 10/1987 | |
| FR | 2 754 024 | | 4/1998 | |
| GB | 1 447 078 | | 8/1976 | |
| JP | 4-7730 | | 1/1992 | |
| JP | 4-88722 | | 7/1992 | |
| JP | 9-210080 | | 8/1997 | |

* cited by examiner

*Primary Examiner*—Greg Binda
(74) *Attorney, Agent, or Firm*—Birch, Stewart, Kolasch & Birch, LLP

(57) ABSTRACT

When forcibly mounting a fixture attached with a joint boot on an outer circumferential surface of an outer cup, a thick-walled section is pressed between an inclined surface of the outer cup and an annular stepped section of the fixture. Accordingly, the thick-walled section is elastically deformed and in close contact with the inclined surface for effecting sealing function.

8 Claims, 4 Drawing Sheets

ATTACHMENT STRUCTURE FOR JOINT BOOT

BACKGROUND OF THE INVENTION

1. Field of the Invention

The present invention relates to an attachment structure for a joint boot to be attached to a constant velocity universal joint for transmitting rotary driving force.

2. Description of the Related Art

A constant velocity universal joint is generally used in order to transmit the rotary driving force from a drive shaft to a driven shaft in a vehicle such as an automobile. A bellows-shaped boot is attached to the constant velocity universal joint in order to reliably maintain the liquid tightness of the inside.

Specifically, one end of the boot is attached for closing an opening of a housing (outer cup) of the constant velocity universal joint. The other end of the boot is fitted on the outer circumference of the driven shaft.

A method of attaching the boot is known, in which a fixture formed of an annular iron plate is used. A part of the fixture is forcibly inserted or tightened on a shaft and an outer cup. An end of the boot is covered and tightened with another part of the fixture. Accordingly, the boot is attached to the shaft and the outer cup (see Japanese Laid-Open Utility Model Publication No. 4-7730).

In another method, a clamp ring having an inner diameter smaller than a diameter of a circumferential groove of a boot is forcibly inserted into the groove of the boot, thereby attaching the boot to the shaft and the outer cup (see Japanese Laid-Open Utility Model Publication No. 4-88722).

In the conventional methods of attaching the boot as described above, the boot attached to the outer cup is prevented from suffering any deviation by the clamp ring or the tightening portion of the fixture. However, the seal portion may be deviated due to secular changes, and the sealing function may be deteriorated for the lubricating oil enclosed in the outer cup.

SUMMARY OF THE INVENTION

A general object of the present invention is to provide an attachment structure for a joint boot, which makes it possible to reliably achieve the sealing function for the lubricating oil enclosed in an outer cup by avoiding any deviation of a seal portion even when the joint boot suffers from secular changes.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
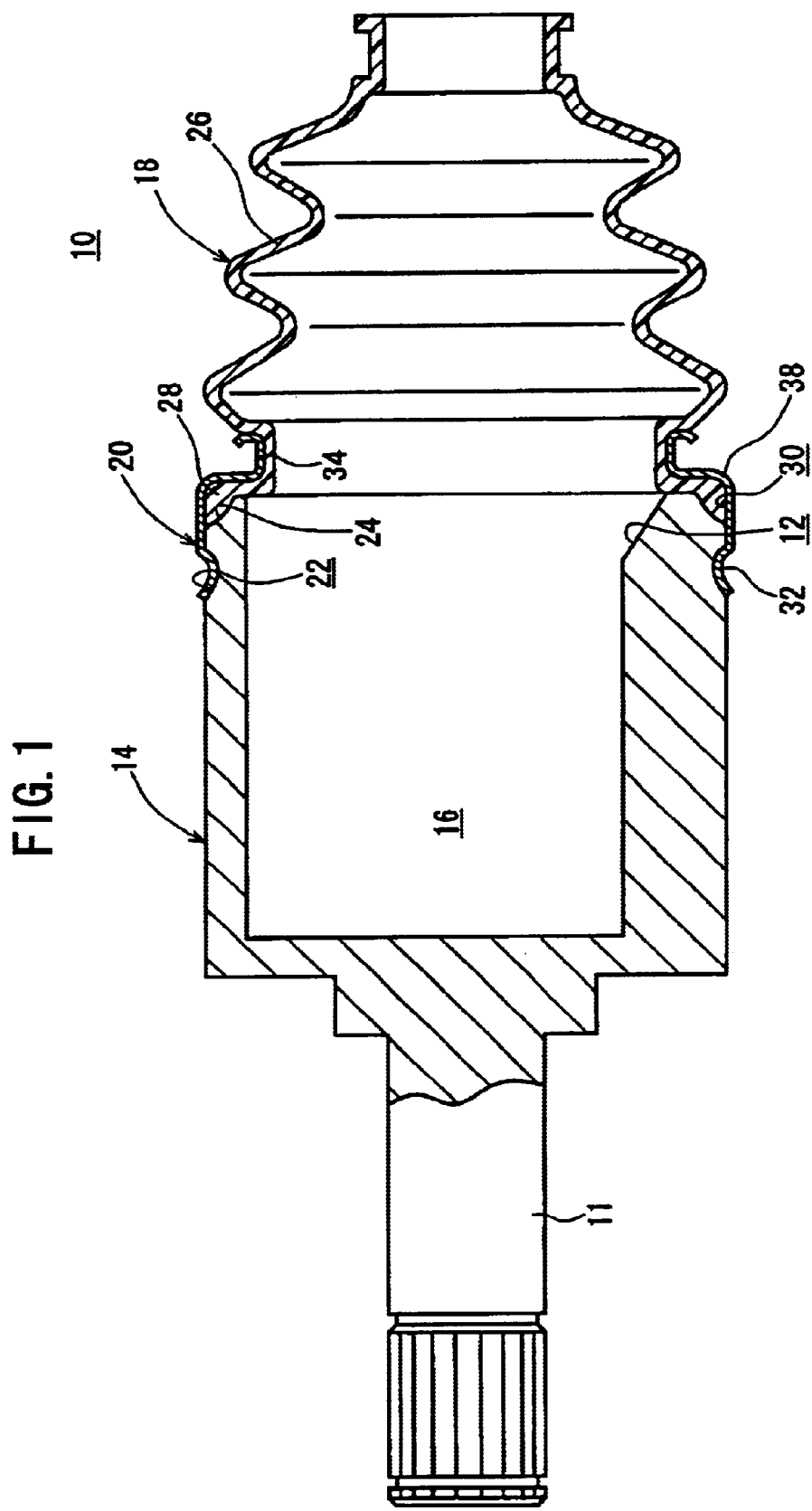
FIG. 1 is a longitudinal sectional view illustrating a schematic arrangement of a constant velocity universal joint to which an attachment structure for a joint boot according to an embodiment of the present invention is applied.

With reference to FIG. 1, reference numeral 10 indicates a constant velocity universal joint to which an attachment structure for a joint boot according to an embodiment of the present invention is applied.

The constant velocity universal joint 10 comprises a cylindrical outer cup 14 which has an opening 12 and which is integrally connected to one end of a first shaft 11, an unillustrated inner member which is secured to one end of an unillustrated second shaft and which is accommodated in a hole 16 of the outer cup 14, a bellow-shaped joint boot 18 which has one end fitted to the outer circumference of the outer cup 14 and which has the other end fitted to the outer circumference of the unillustrated second shaft, and a cylindrical fixture 20 which is used to attach the joint boot 18 to the outer cup 14.

In the embodiment of the present invention, the joint boot 18 is integrally formed of a resin material. However, the joint boot 18 may be integrally formed of a rubber material.

Figure 2:
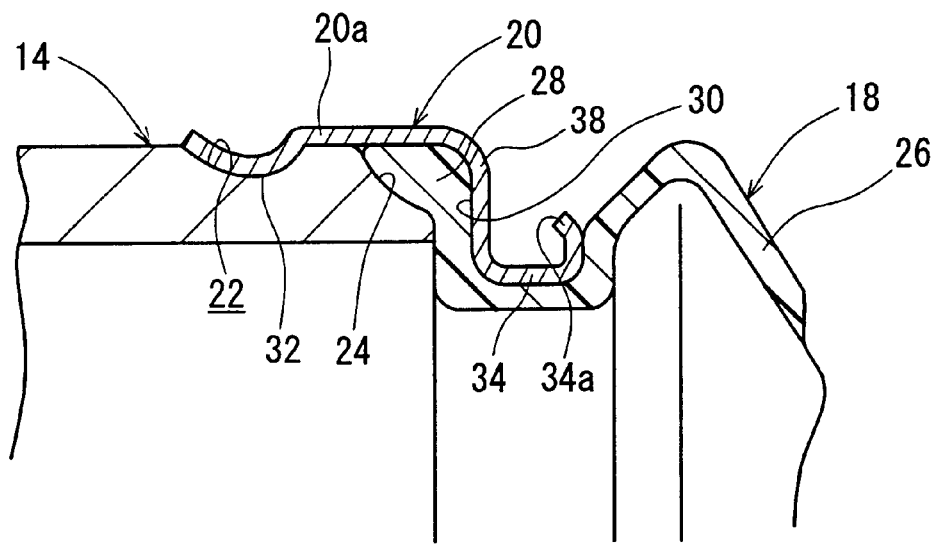
FIG. 2 is a magnified longitudinal sectional view, with partial omission, of FIG. 1.

An annular groove 22, which has a substantially arc-shaped cross section, is formed on the outer circumferential surface in the vicinity of the opening 12 of the outer cup 14. An inclined surface 24 is formed at a circumferential end of the opening 12 of the outer cup 14 such that the thickness is gradually decreased in the direction toward the joint boot 18. For example, as shown in FIG. 2, the outer circumferential portion at the end of the outer cup 14, which is close to the annular groove 22, is cut out so that the cut portion is inclined at a predetermined angle to the right, that is, toward the inner circumference. Accordingly, the annular inclined surface 24 is formed.

As shown in FIG. 1, the joint boot 18 has a bellows section 26 with a wave-shaped cross section. An elastic thick-walled section 28 is formed at one end of the bellows section 26. The thick-walled section 28 has a large diameter corresponding to the diameter of the outer cup 14, and is thick-walled as compared with the bellows section 26. The other end of the bellows section 26 has a small diameter corresponding to the unillustrated second shaft. The thick-walled section 28 can be elastically deformed into a shape corresponding to a space 30 which is surrounded by the inner wall surface of the fixture 20 and the inclined surface 24 of the outer cup 14.

When the joint boot 18 is integrally molded with a resin material, a so-called two-color molding material is used, with which a soft polymer material and a hard polymer material are molded continuously in an integrated manner. The bellows section 26 may be formed of the hard polymer material, while the thick-walled section 28 is formed of the soft polymer material.

As shown in FIG. 2, an annular projection 32, which fastens on the annular groove 22 of the outer cup 14 and which has a substantially arc-shaped cross section corresponding to the shape of the annular groove 22, is formed at one end of the fixture 20. An annular bent section 34, which is bent to give a substantially L-shaped cross section, is formed at the other end of the fixture 20. An end 34a of the annular bent section 34 is folded toward the outer cup 14 in order to protect the bellows section 26 which is formed to be thin-walled. The inner diameter of an attaching section 20a of the fixture 20 formed with the annular projection 32 is slightly smaller than the outer diameter of the outer cup 14 formed with the opening 12, because the attaching section 20a is forcibly mounted on the outer cup 14 as described later on.

An annular stepped section 38, which is bent substantially perpendicularly with respect to the attaching section 20a, is formed between the annular projection 32 and the annular bent section 34. The annular stepped section 38 is opposed to the inclined surface 24 of the outer cup 14 with a predetermined spacing distance intervening therebetween when the fixture 20 is attached to the outer cup 14 (see FIG. 2).

Figure 4:
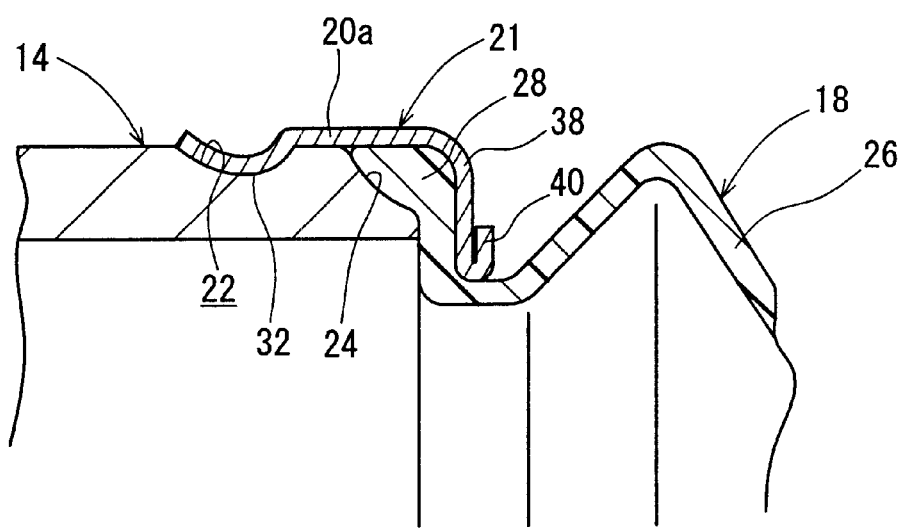
FIG. 4 shows a magnified longitudinal sectional view, with partial omission, illustrating a modified embodiment of the fixture.

Alternatively, as shown in FIG. 4, a fixture 21 may be used, wherein a terminal end 40, which extends downwardly from the annular stepped section 38, is entirely folded in a substantially U-shaped configuration, without providing the annular bent section 34 having the substantially L-shaped cross section. An edge of the terminal end 40 is not in contact with the bellows section 26.

The constant velocity universal joint 10, to which the attachment structure for the joint boot according to the embodiment of the present invention is applied, is basically constituted as described above. Next, explanation will be made for a method for attaching the joint boot 18 to the outer cup 14.

Figure 3:
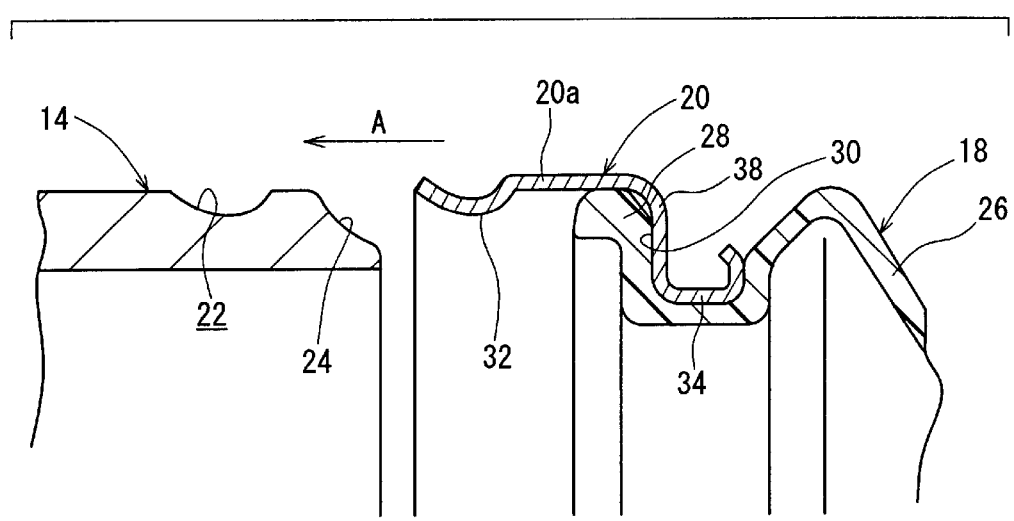
FIG. 3 is a magnified longitudinal sectional view, with partial omission, illustrating a method for attaching a fixture to an outer cup.

At first, the fixture 20 is attached to the thick-walled section 28 of the joint boot 18 so that the thick-walled section 28 is engaged with the inner wall surface of the annular stepped section 38 of the fixture 20, and the annular bent section 34 of the fixture 20 is engaged with the recess of the bellows section 26 disposed closely to the thick-walled section 28 (see FIG. 3).

Subsequently, an unillustrated jig is attached to the fixture 20. The fixture 20 is forcibly mounted on the outer cup 14 in the direction of the arrow A shown in FIG. 3 by the pressing action effected by an unillustrated press machine. The fixture 20 is displaced on the outer cup 14 until the annular projection 32 of the fixture 20 is fitted on the annular groove 22 of the outer cup 14. The joint boot 18 is attached to the outer cup 14 by the fixture 20.

When the fixture 20 is forcibly mounted on the outer circumferential surface of the outer cup 14, then the thick-walled section 28 of the joint boot 18 is pressed and sandwiched by the inclined surface 24 of the outer cup 14 and the inner wall surface of the substantially right-angled annular stepped section 38 of the fixture 20. The thick-walled section 28 is elastically deformed to have a substantially triangular cross section corresponding to the space 30 surrounded by the inclined surface 24 and the inner wall surface of the annular stepped section 38. The elastically deformed thick-walled section 28 is in close contact with the inclined surface 24, while being regulated by the annular stepped section 38. Thus, the sealing function is effected (see FIG. 2).

Therefore, in the embodiment of the present invention, even when the constant velocity universal joint 10 suffers from secular changes, the sealing function is exhibited owing to the close contact between the thick-walled section 28 and the inclined surface 24 of the outer cup 14 by the elastic force of the thick-walled section 28. It is possible to avoid any deterioration of the sealing function.

In other words, the sealing function is exhibited by pressing the inclined surface 24 of the outer cup 14 by means of the elastic force of the thick-walled section 28 to increase the surface pressure thereof. Therefore, the sealing capability can be well retained even when the joint boot 18 suffers from secular changes. As a result, in the embodiment of the present invention, it is possible to reliably achieve the sealing function for the lubricating oil enclosed in the outer cup 14 by avoiding any deviation at the sealing portion, even when the joint boot 18 suffers from secular changes.

The fixture 20, which is forcibly mounted on the outer cup 14, reliably fastens by attaching the annular projection 32 formed at one end thereof on the annular groove 22 of the outer cup 14. Thus, the fixture 20 is prevented from being disengaged from the outer cup 14.

In the embodiment of the present invention, the sealing function can be achieved for the lubricating oil by forcibly mounting the fixture 20 on the outer cup 14. Therefore, it is possible to reduce the number of assembling steps. Further, for example, only the unillustrated jig and the press machine may be prepared as the equipment for effecting the assembling operation, and no special equipment is required. Therefore, the assembling operation can be performed easily and conveniently by using the existing general-purpose apparatuses. As a result, it is possible to improve the production efficiency, and to reduce the cost.

Additionally, an unillustrated fixture, which has a diameter smaller than that of the fixture 20 described above, may be used to attach the small-sized end of the joint boot 14 to the unillustrated second shaft.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. An attachment structure for a joint boot for attaching said joint boot to an outer cup of a constant velocity universal joint, said attachment structure comprising:

an inclined surface formed at a circumferential end of an opening of said outer cup;

a bellows section of said joint boot:

a thick-walled section of said joint boot, having a wall thickness that is thicker in comparison to a wall thickness of said bellows section, said thick-walled section being made of an elastic material formed integrally at a circumferential end of said bellows section of said joint boot; and a fixture comprising a ring member to be forcibly mounted on an outer circumferential surface of said outer cup, said fixture having an annular stepped section for being engaged with said thick-walled section, wherein said thick-walled section pressed between said inclined surface of said outer cup and said annular stepped section of said fixture, said thick-walled section being elastically deformed by forcibly mounting said fixture attached with said joint boot on said outer circumferential surface of said outer cup, whereby said inclined surface and said elastically deformed thick-walled section are pressed in close contact with each other to effect a sealing function, and wherein said thick-walled section is compressed against said inclined surface such that compression forces are exerted on said thick-walled section in a direction opposite to a direction (A) in which said fixture is displaced to mount said fixture on said outer cup.

2. The attachment structure for said joint boot according to claim 1, wherein said elastic material is made of at least one of a rubber material and a resin material.

3. The attachment structure for said joint boot according to claim 1, wherein an annular projection is provided at one end of said fixture for fastening on an annular groove formed on said outer circumferential surface of said outer cup.

4. The attachment structure for said joint boot according to claim 3 wherein an annular bent section is provided at another end of said fixture for being engaged with a recess of said bellows section of said joint boot.

5. The attachment structure for said joint boot according to claim 4, wherein an end of said annular bent section is folded toward said outer cup.

6. The attachment structure for said joint boot according to claim 4 wherein a terminal end is provided at the other end of said fixture such that said terminal end is continuous from said annular stepped section and folded in a substantially U-shaped configuration.

7. The attachment structure for said joint boot according to claim 1, wherein said annular stepped section is bent substantially perpendicularly to an attaching section attached to said outer cup.

8. The attachment structure for said joint boot according to claim 7, wherein a predetermined spacing distance is given between said annular stepped section and said inclined surface of said outer cup, when said fixture is attached to said outer cup.

* * * * *